US008484629B2

(12) United States Patent
Dengler et al.

(10) Patent No.: US 8,484,629 B2
(45) Date of Patent: Jul. 9, 2013

(54) PROGRAMMING MODEL FOR MODULAR DEVELOPMENT (75) Inventors: Patrick Dengler, Redmond, WA (US); Oleg Lvovitch, Seattle, WA (US); Randy Kimmerly, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 1478 days.

(21) Appl. No.: 11/805,729

(22) Filed: May 24, 2007

(65) Prior Publication Data

US 2008/0295066 A1    Nov. 27, 2008

(51) Int. Cl.
G06F 9/45    (2006.01)

(52) U.S. Cl.
USPC ............ 717/144; 717/104; 717/141; 717/146

(58) Field of Classification Search
USPC .......................................................... 717/104
See application file for complete search history.

(56) References Cited

U.S. PATENT DOCUMENTS

| | | | | |
|---|---|---|---|---|
| 5,297,284 A | * | 3/1994 | Jones et al. | 717/137 |
| 5,371,891 A | * | 12/1994 | Gray et al. | 717/140 |
| 5,557,730 A | * | 9/1996 | Frid-Nielsen | 715/839 |
| 5,581,762 A | * | 12/1996 | Hayashi et al. | 717/144 |
| 5,857,105 A | * | 1/1999 | Ayers et al. | 717/144 |
| 6,077,315 A | * | 6/2000 | Greenbaum et al. | 717/157 |
| 6,078,746 A | * | 6/2000 | Simonyi | 717/144 |
| 6,097,888 A | * | 8/2000 | Simonyi | 717/144 |
| 6,173,444 B1 | * | 1/2001 | Archambault | 717/159 |
| 6,182,282 B1 | * | 1/2001 | Stoodley et al. | 717/116 |
| 6,317,870 B1 | * | 11/2001 | Mattson, Jr. | 717/151 |
| 6,658,657 B1 | * | 12/2003 | Lueh | 717/158 |
| 6,851,111 B2 | * | 2/2005 | McGuire et al. | 717/166 |
| 6,877,163 B1 | | 4/2005 | Jones et al. | |
| 6,968,538 B2 | | 11/2005 | Rust et al. | |
| 7,032,230 B2 | * | 4/2006 | Gray-Donald et al. | 719/331 |
| 7,150,008 B2 | | 12/2006 | Cwalina et al. | |
| 7,219,340 B2 | * | 5/2007 | Schechter et al. | 717/144 |

(Continued)

FOREIGN PATENT DOCUMENTS

JP    2007-236750 A    9/2007

OTHER PUBLICATIONS

International Search Report and Written Opinion Received for PCT Application No. PCT/US2008/063997, mailed on Sep. 10, 2008, 10 pages.
"European Search Report", Mailed Date: Feb. 3, 2011, Application No. EP/08755781, Filed Date: Feb. 2, 2011, pp. 9.

(Continued)

Primary Examiner — Wei Zhen
Assistant Examiner — Matthew Brophy (57) ABSTRACT

Various technologies and techniques are disclosed for providing a programming model for modular development. A definition feature is provided that allows a definition to be specified for a particular method that is part of an application. A production feature allows a functionality implementation to be specified for the particular method separately from the definition. A consumption feature allows a method call to be made indirectly to the functionality implementation of the particular method by referencing the definition of the particular method from a consuming method. The consuming method has no awareness of the functionality implementation for the particular method. An analysis process inspects components containing indirect associations between these consumers and producers of application functionality to generate a graph of direct associations between the consumers and producers without having to actually load the components. A loader process uses the graph of direct associations to run the application.

16 Claims, 8 Drawing Sheets

U.S. PATENT DOCUMENTS

| | | | |
|---|---|---|---|
| 7,380,234 B2* | 5/2008 | Gil et al. | 717/108 |
| 7,627,861 B2* | 12/2009 | Smith et al. | 717/144 |
| 7,707,566 B2* | 4/2010 | Grover et al. | 717/148 |
| 7,743,368 B2* | 6/2010 | Das | 717/151 |
| 7,788,652 B2* | 8/2010 | Plesko et al. | 717/146 |
| 8,307,350 B2* | 11/2012 | Hiniker | 717/140 |
| 2003/0046449 A1* | 3/2003 | Gray-Donald et al. | 709/330 |
| 2003/0131347 A1* | 7/2003 | Allison | 717/165 |
| 2003/0177140 A1 | 9/2003 | Debard et al. | |
| 2003/0225935 A1 | 12/2003 | Rivard et al. | |
| 2004/0006765 A1 | 1/2004 | Goldman | |
| 2004/0068720 A1* | 4/2004 | Hundt | 717/158 |
| 2004/0107414 A1 | 6/2004 | Bronicki et al. | |
| 2004/0163091 A1 | 8/2004 | Brill | |
| 2005/0262480 A1 | 11/2005 | Pik et al. | |
| 2006/0143148 A1 | 6/2006 | Degtyar et al. | |
| 2006/0143597 A1 | 6/2006 | Alaluf et al. | |
| 2006/0200796 A1 | 9/2006 | Ota et al. | |
| 2007/0061799 A1 | 3/2007 | Kimmerly | |
| 2007/0129931 A1 | 6/2007 | Lee et al. | |

OTHER PUBLICATIONS

Drayton, et al., "C sharp in a Nutshell", Retrieved at << http://proquest.safaribooksonline.com/book/programming/csharp/0596005261 >>, Aug. 28, 2003, pp. 20.

Response to European Search Report, dated Aug. 30, 2011, Application No. EP/08755781, 12 pages.

European Office Action dated Feb. 1, 2012, Application No. EP/08755781.5, 4 pages.

Response to European Office Action mailed Jun. 11, 2012, Application No. EP/08755781.5, 13 pages.

"Microsoft .NET Framework 3.0 Programming Model", Date: 2007, http://msdn2.microsoft.com/en-us/library/ms687300.aspx.

Vasian Cepa, Mira Mezini: Language Support for Model-Driven Software Development,.Special issue of the Journal Science of Computer Programming on Model DrivenArchitecture: Foundations and Applications. Elsevier Science, 2004.

Ivo Damyanov, Nick Holmes, Metadata driven code generation using .NET framework, Proceedings of the 5th international conference on Computer systems and technologies, Jun. 17-18, 2004, Rousse, Bulgaria.

* cited by examiner

PROGRAMMING MODEL FOR MODULAR DEVELOPMENT

BACKGROUND

Computer software can be written by software developers using one or more software development tools. In software development programs, the developer writes a series of code segments called methods or functions that are each designed to perform one or more tasks. The developer also writes code that connects the methods together so that they are executed in one or more desired orders. The typical way of connecting methods together is by making a call to a particular method from within another method. Simple software applications may be written as one or more methods that are contained within a single program file. However, with more comprehensive software applications, it is common is to separate the functionality of the software application into different components or assemblies that are contained in different files. When a first component of the application wants to call one or more methods that are contained in a second component, a reference is made to the second component in the source code of the first component so the first component knows how to find and communicate with the second component. After the reference is made, code can be written to directly call a desired method in the second component.

One problem with directly referencing a particular method in one component from another component is that there is no easy way for a developer to come in later and use different functionality for that particular method. One way the developer can implement the new functionality is to change the source code within that specific method to achieve the different functionality. However, the problem with this potential solution is that the developer may want to keep that particular method intact for use in some situations, yet use a totally different implementation for the present situation. Another option is to write a totally new method that contains the different functionality, and then change the first component to directly reference and call the new method. Both of these solutions can be tedious and greatly limit the extensibility of an application after original product shipment. For example, in the case of MICROSOFT® programming technologies, while extensibility can be fairly achievable using the MICROSOFT® Component Object Model (COM), it is not as achievable using MICROSOFT® .NET. Even when using COM to create the abstraction of interface→implementation, there is no method to determine dependencies or closure. This is especially problematic when derivations are made on specific implementations of a particular method. This locks the original code author to either being locked into one implementation, or to break extensibility based upon that implementation.

SUMMARY

Various technologies and techniques are disclosed for providing a programming model for modular development. A definition feature is provided that allows a definition to be specified for a particular method that is part of an application. A production feature allows a functionality implementation to be specified for the particular method separately from the definition. A consumption feature allows a method call to be made indirectly to the functionality implementation of the particular method by referencing the definition of the particular method from a consuming method. The consuming method has no awareness of the functionality implementation for the particular method. An analysis process inspects components containing indirect associations between these consumers and producers of application functionality to generate a graph of direct associations between the consumers and producers without having to actually load the components. A loader process uses the graph of direct associations to run the application.

In one implementation, an original functionality implementation can be replaced with a different functionality implementation. A publicly accessible definition is provided for a particular method that is part of an application. An original private, inaccessible functionality implementation can be provided for the particular method separately from the definition. A consuming method is provided that indirectly calls the original functionality implementation of the particular method by referencing the definition of the particular method. The consuming method has no awareness and needs no awareness of the original functionality implementation for the particular method. A different or complimentary (additional) functionality implementation is then provided for the particular method to be used in a current configuration of the application instead of the original functionality implementation. An intermediate language version of the application is recompiled to point to the different or multiple functionality implementations.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

For the purposes of promoting an understanding of the principles of the invention, reference will now be made to the embodiments illustrated in the drawings and specific language will be used to describe the same. It will nevertheless be understood that no limitation of the scope is thereby intended. Any alterations and further modifications in the described embodiments, and any further applications of the principles as described herein are contemplated as would normally occur to one skilled in the art.

The system may be described in the general context as an application that provides a framework for developing and/or executing modular software applications, but the system also serves other purposes in addition to these. In one implementation, one or more of the techniques described herein can be implemented as features within a framework program such as MICROSOFT® .NET Framework, or from any other type of program or service that enables the creation and/or execution of software applications.

In one implementation, a platform for developing modular software applications is provided that allows the developer to design code up front that can be extended post development. The system makes use of indirect relationships between consumers and producers, and the isolation of these components, to make the application flexible and extensible. The terms consumer and consuming method as used herein are meant to include a method, function, procedure, or other process that wishes to execute functionality contained elsewhere. The term producer as used herein is meant to include a method, function, procedure, or other process that implements an underlying functionality for a particular purpose. A definition is provided by a public interface or other means to specify what the functionality implementation should look like (e.g. its signature or contract), and optionally includes metadata that can be used by the consumer to differentiate between intended uses. The consuming method references this definition at the spot where it wishes to call the actual producer, instead of directly referencing the producer itself. An analysis process is responsible for generating a graph of direct relationships from these indirect relationships. The term "graph of direct relationships" is meant to include a graph, list, or other data structure that contains the list of direct relationships. The loader then uses this graph of relationships to run the application appropriately. By using these indirect relationships instead of direct connections between producers and consumers, the system allows new implementations to be plugged in post-shipment or at other times to allow for different application configurations.

Figure 1:
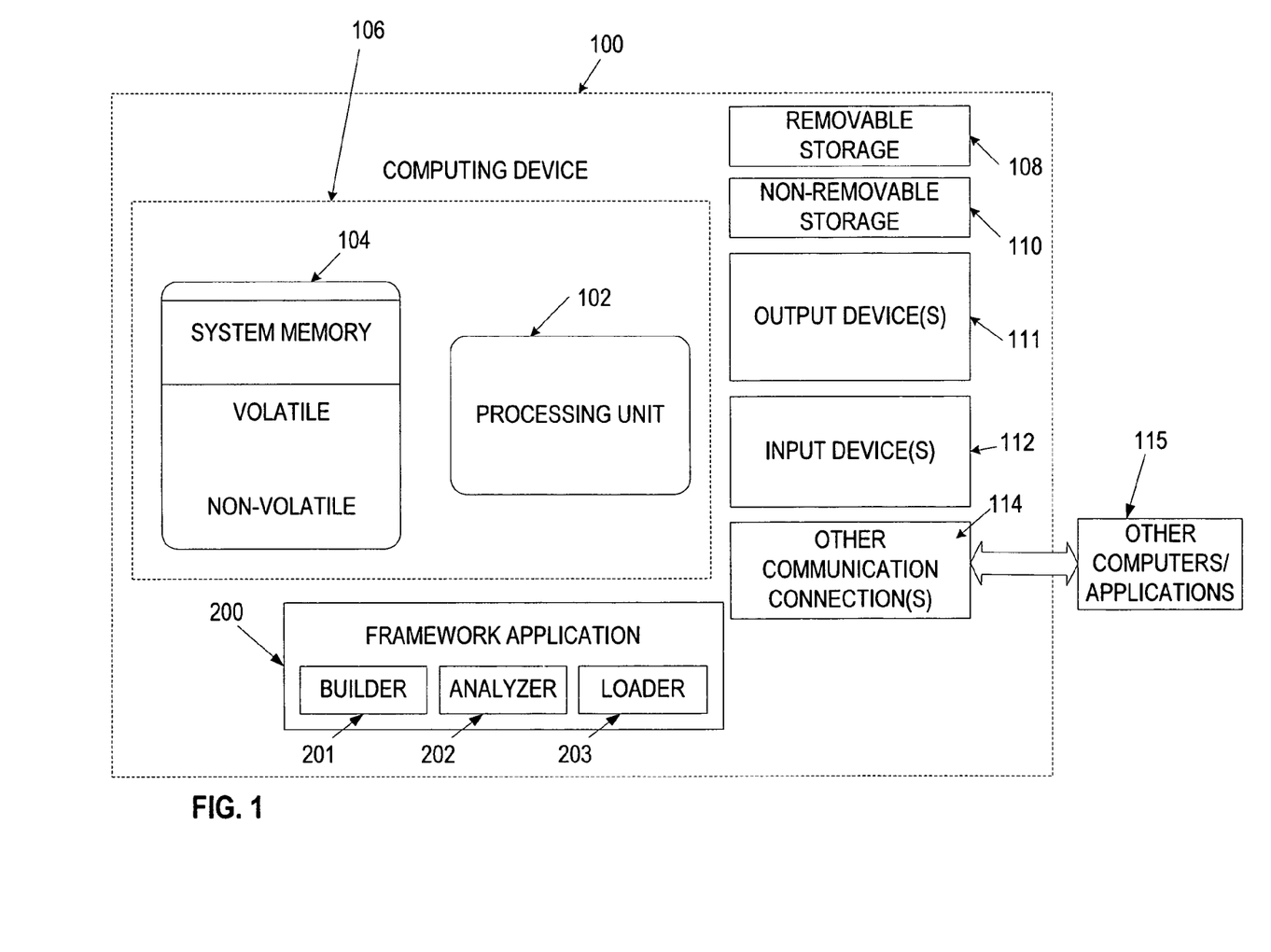
FIG. 1 is a diagrammatic view of a computer system of one implementation.

As shown in FIG. 1, an exemplary computer system to use for implementing one or more parts of the system includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106.

Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Computing device 100 includes one or more communication connections 114 that allow computing device 100 to communicate with other computers/applications 115. Device 100 may also have input device(s) 112 such as keyboard, mouse, pen, voice input device, touch input device, etc. Output device(s) 111 such as a display, speakers, printer, etc. may also be included. These devices are well known in the art and need not be discussed at length here.

In one implementation, computing device 100 includes framework application 200. Framework application 200 can include various components that enable the creation and/or execution of software applications, such as a builder component 201, an analyzer component 202, and a loader component 203. In one implementation, the builder component 201 provides the programming patterns and practices that are used in the framework, along with verification tools that check and enforce adherence to these rules at build time. These programming patterns and practices are described in further detail in various figures herein, including FIGS. 2-5. In one implementation, the analyzer component 202 is responsible for connecting producers and consumers together. The analyzer component 202 ensures that all required service dependencies that are otherwise indirect are satisfied and that the model is complete, as described in FIGS. 2 and 6. In one implementation, the loader component 203 handles loading and activation of programs/assemblies, transfers calls from consumers to the appropriate functionality producers, and in the case of extensions, provides access to their associated metadata. Once constructed and linked together, though, the application generally executes with very little involvement from the loader. The loader component 203 is also described in further detail in various figures herein, such as FIGS. 7 and 8. While FIG. 1 shows the framework application 200 as having three components: builder 201, analyzer 202, and loader 203, it will be appreciated that in other implementations, fewer, all, and/or additional components can be included. Several features of framework application 200 will now be described in reference to FIG. 2.

Figure 2:
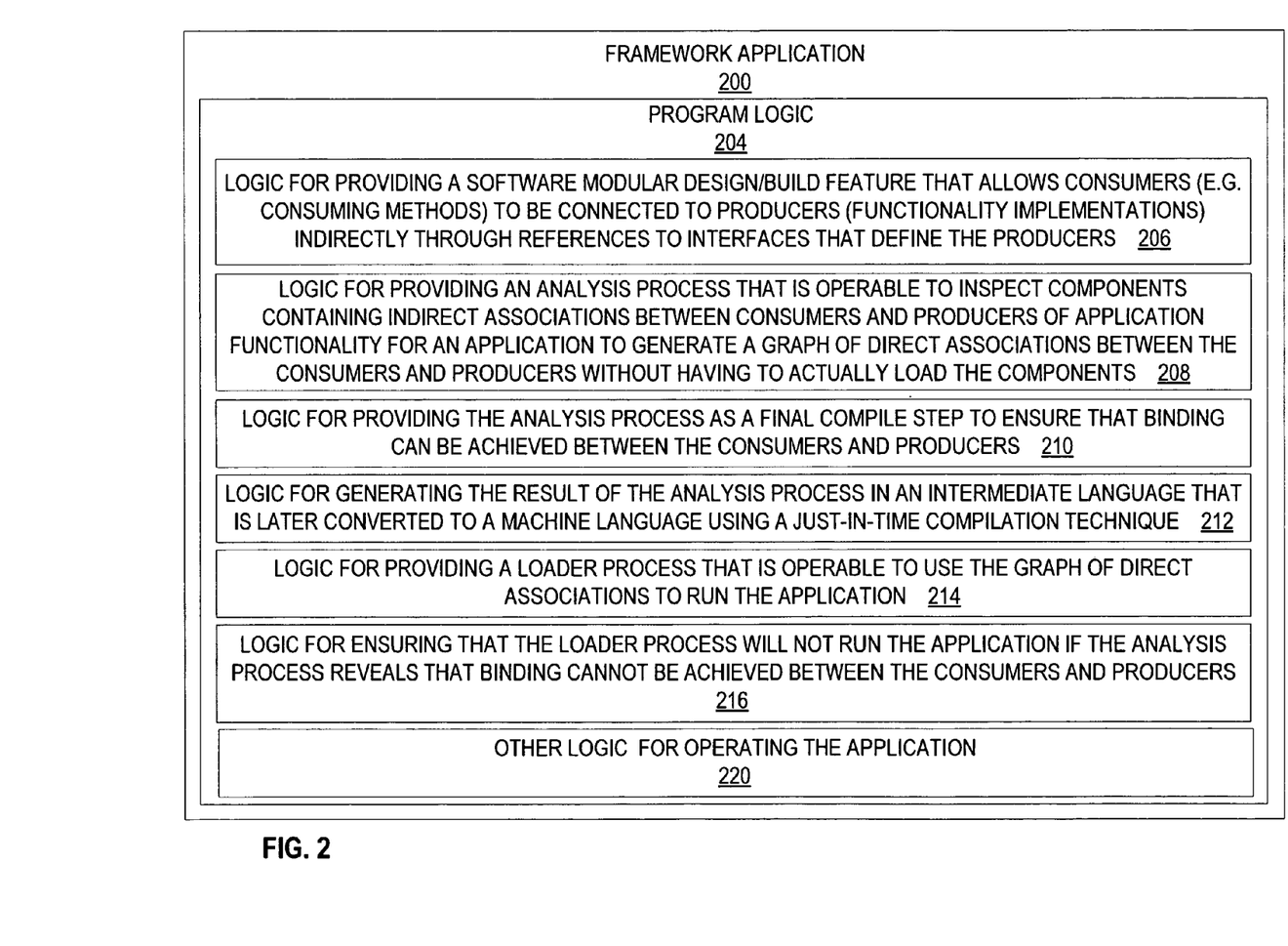
FIG. 2 is a diagrammatic view of a framework application of one implementation operating on the computer system of FIG. 1.

Turning now to FIG. 2 with continued reference to FIG. 1, a framework application 200 operating on computing device 100 is illustrated. Framework application 200 is one of the application programs that reside on computing device 100. However, it will be understood that framework application 200 can alternatively or additionally be embodied as computer-executable instructions on one or more computers and/or in different variations than shown on FIG. 1. Alternatively or additionally, one or more parts of framework application 200 can be part of system memory 104, on other computers and/or applications 115, or other such variations as would occur to one in the computer software art.

Framework application 200 includes program logic 204, which is responsible for carrying out some or all of the techniques described herein. Program logic 204 includes logic for providing a software modular design/build feature that allows consumers (e.g. consuming methods) to be connected to producers (functionally implementations) indirectly through references to interfaces that define the producers 206; logic for providing an analysis process that is operable to inspect components containing indirect associations between consumers and producers of application functionality for an application to generate a graph of direct associations between the consumers and producers without having to actually load the components 208; logic for providing the analysis process as a final compile step to ensure that binding can be achieved between the consumers and producers 210; logic for generating the result of the analysis process in an intermediate language that is later converted to a machine language using just-in-time compilation techniques 212; logic for providing a loader process that is operable to use the graph of direct associations to run the application 214; logic for ensuring that the loader process will not run the application if the analysis process reveals that binding cannot be achieved between the consumers and producers 216; and other logic for operating application 220. In one implementation, program logic 204 is operable to be called programmatically from another program, such as using a single call to a procedure in program logic 204.

Figure 3:
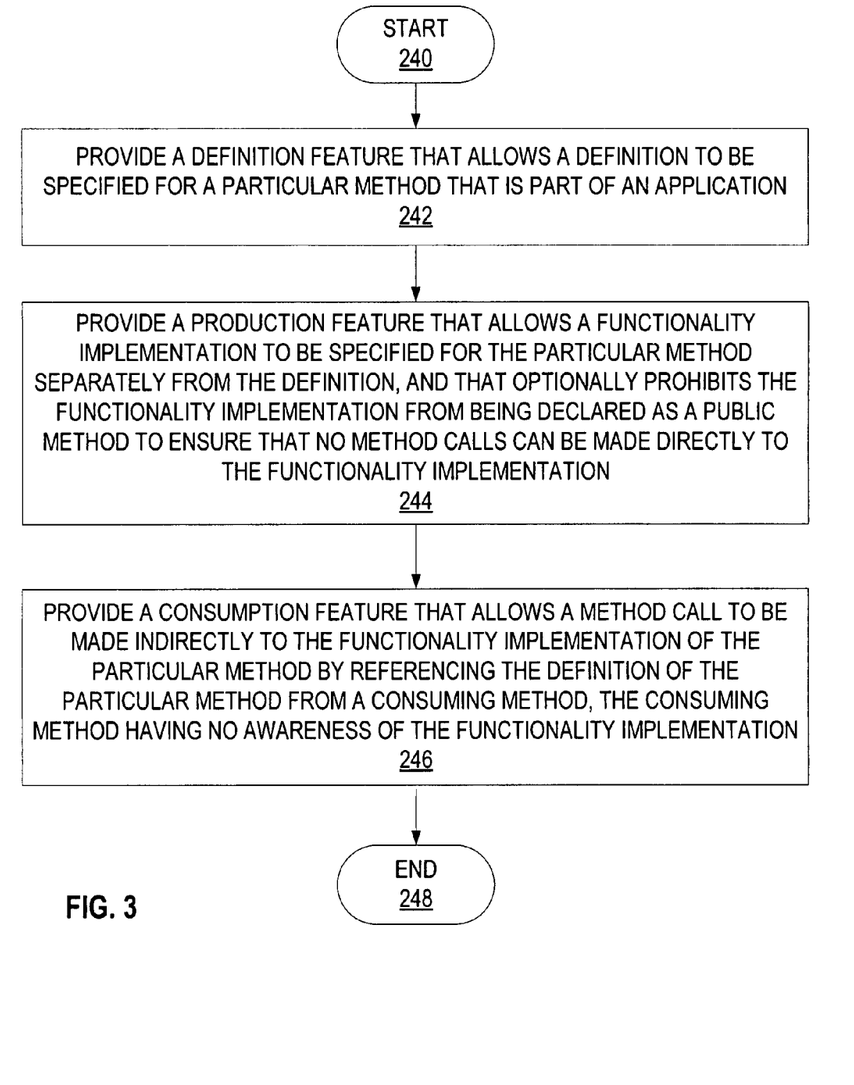
FIG. 3 is a process flow diagram for one implementation of the system of FIG. 1 that illustrates the definition, production, and consumption features a programming model for modular development.

Turning now to FIGS. 3-9 with continued reference to FIGS. 1-2, the stages for implementing one or more implementations of framework application 200 are described in further detail. FIG. 3 is a process flow diagram for framework application 200 that illustrates the definition, production, and consumption features of a programming model for modular development. In one form, the process of FIG. 3 is at least partially implemented in the operating logic of computing device 100. The process begins at start point 240 with providing a definition feature that allows a definition to be specified for a particular method that is part of an application (stage 242). A production feature is provided that allows a functionality implementation to be specified for the particular method separately from the definition (stage 244). In one implementation, the production feature optionally prohibits the functionality implementation from being declared as a public method to ensure that no method calls can be made directly to the functionality implementation (stage 244). A consumption feature is provided that allows a method call to be made indirectly to the functionality implementation of the particular method by referencing the definition of the particular method from a consuming method (stage 246). The consuming method has no awareness of the functionality implementation (stage 246). While the example described in FIG. 3 and some other figures discusses just one particular method, the definition, production, and consumption features can be used with multiple methods or functions to build a software application. The process ends at end point 248.

Figure 4:
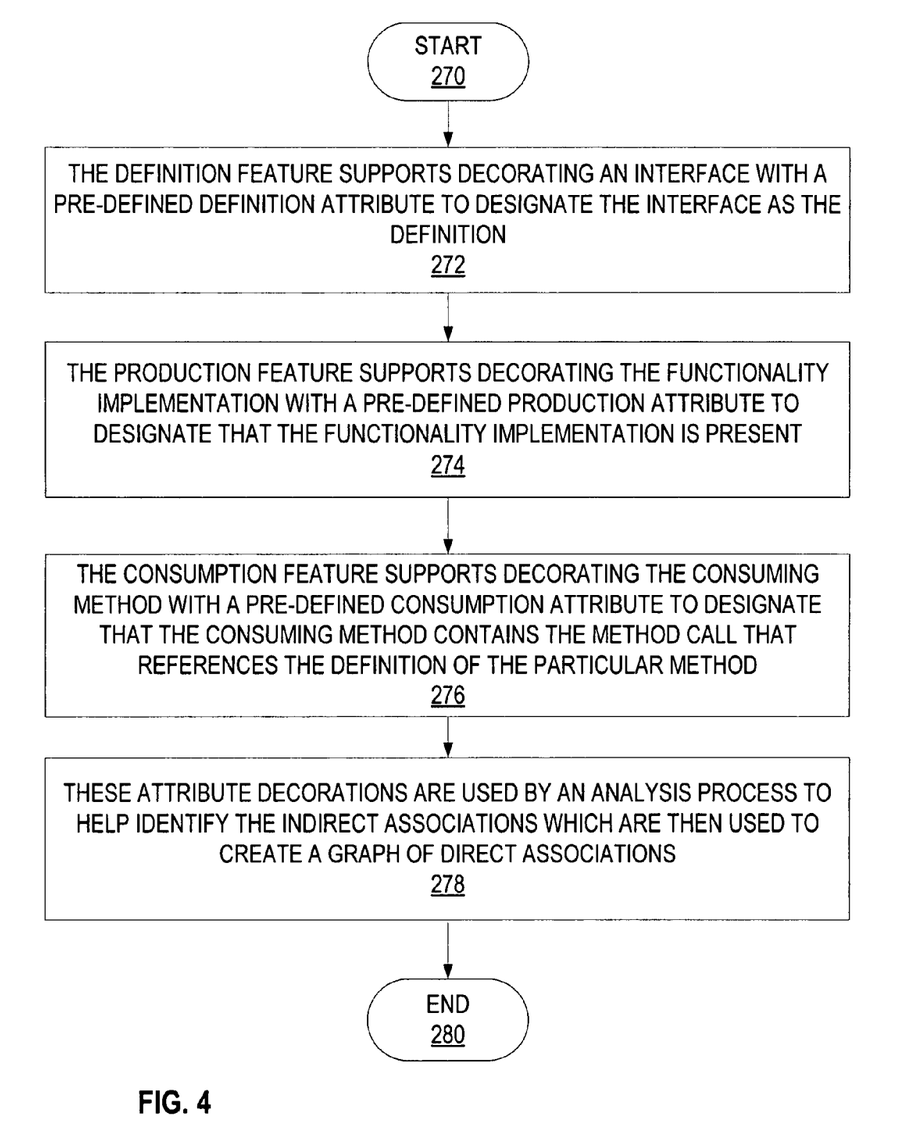
FIG. 4 is a process flow diagram for one implementation of the system of FIG. 1 illustrating the stages involved in using pre-defined attributes with the definition, production, and consumption features to designate the respective areas in the source code.

FIG. 4 illustrates one implementation of the stages involved in using pre-defined attributes with the definition, production, and consumption features to designate the respective areas in the source code. In one form, the process of FIG. 4 is at least partially implemented in the operating logic of computing device 100. The process begins at start point 270 with the definition feature supporting decorating an interface with a pre-defined definition attribute to designate the interface as the definition (stage 272). The production feature supports decorating the functionality implementation with a pre-defined production attribute to designate that the functionality implementation is present (stage 274). The consumption feature supports decorating the consuming method with a pre-defined consumption attribute to designate that the consuming method contains the method call that references the definition of the particular method (stage 276). These attribute decorations are used by an analysis process to help identify the indirect associations which are then used to create a graph of direct association (stage 278). The process ends at end point 280.

Figure 5:
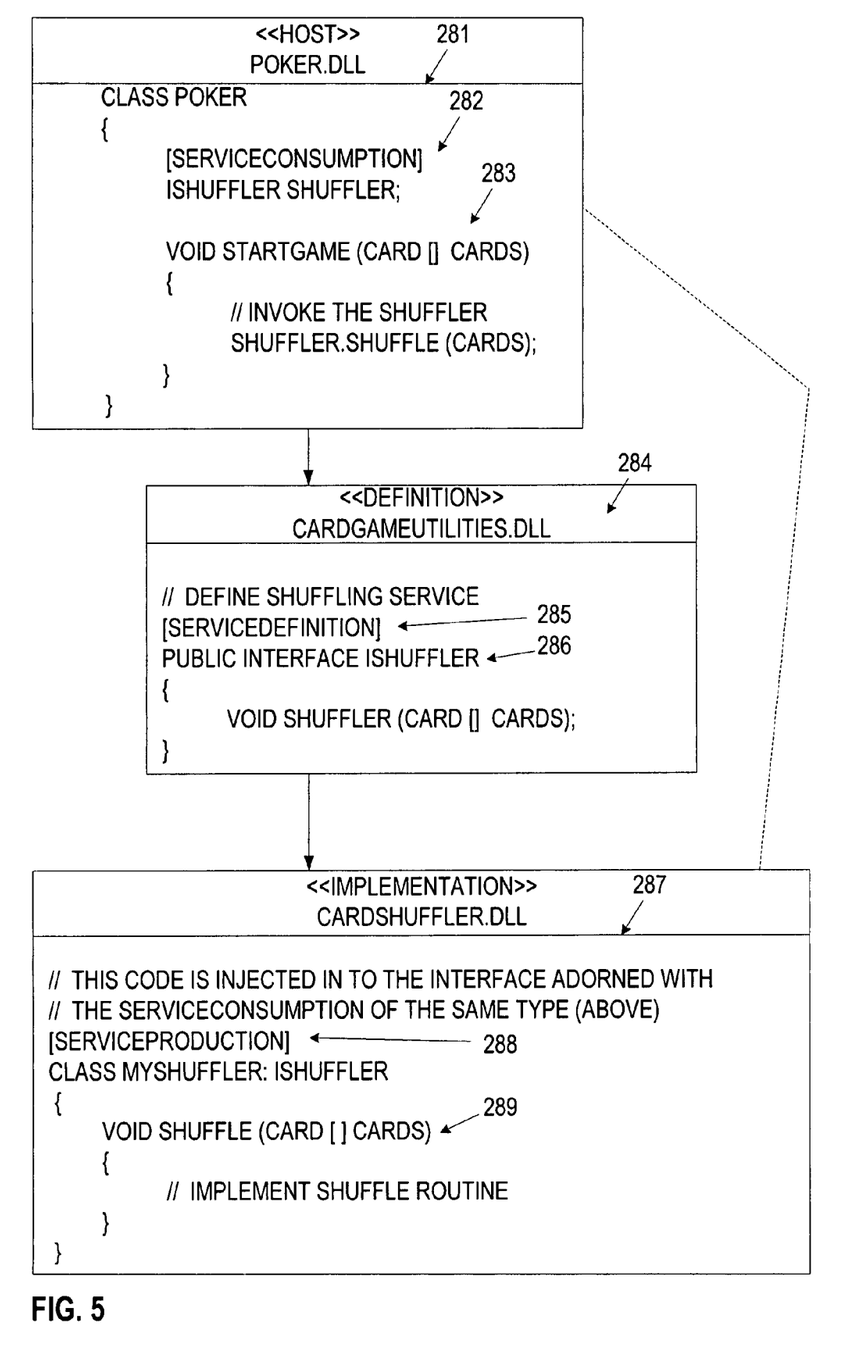
FIG. 5 is a diagram for one implementation of the system of FIG. 1 illustrating some exemplary source code that uses the definition, production, and consumption features and the respective pre-defined attributes to create a portion of a software application.

FIG. 5 is a diagram of one implementation that illustrates some exemplary source code that uses the definition, production, and consumption features described in FIG. 3 and the respective pre-defined attributes described in FIG. 4 to create a portion of a software application. In one form, some or all of the features illustrated in FIG. 5 are at least partially implemented in the operating logic of computing device 100. Three separate components or assemblies are shown, called Poker.dll 281, CardGameUtilities.dll 284, and CardShuffler.dll 287. As described in further detail herein in the discussion of FIG. 5, the Poker.dll component 281 is the consumer component (e.g. consumer), the CardGameUtilities.dll component 284 is the definition component, and the CardShuffler.dll component 287 is the production component (e.g. producer).

A pre-defined definition attribute called "ServiceDefinition" 285 is provided in the definition component, CardGameUtilities.dll 284. This pre-defined definition decorates a public interface called "iShuffler" 286. The iShuffler public interface 286 defines the contract for what the particular "shuffler" method should look like in an underlying functionality implementation. The functionality implementation is actually provided in the separate production component, CardShuffler.dll component 287. A pre-defined production attribute called "ServiceProduction" 288 decorates the functionality implementation of the "Shuffle" method 289. The actual code to implement the desired functionality is provided in the "Shuffle" method 289. The consumer component, Poker.dll 281 contains a method call to the shuffle method from within the StartGame method 283. However, the method call is itself indirect in that it does not directly reference the actual shuffle method 289, but instead only references the definition provided in the public interface 286 of the definition component 284. Thus, the consumer component 281 has no knowledge of the production component 287 that contains the actual implementation. As described in further detail herein, it is the job of the analyzer and loader to assemble and load these indirect references into a graph of direct relationships that can be executed in the application.

Figure 6:
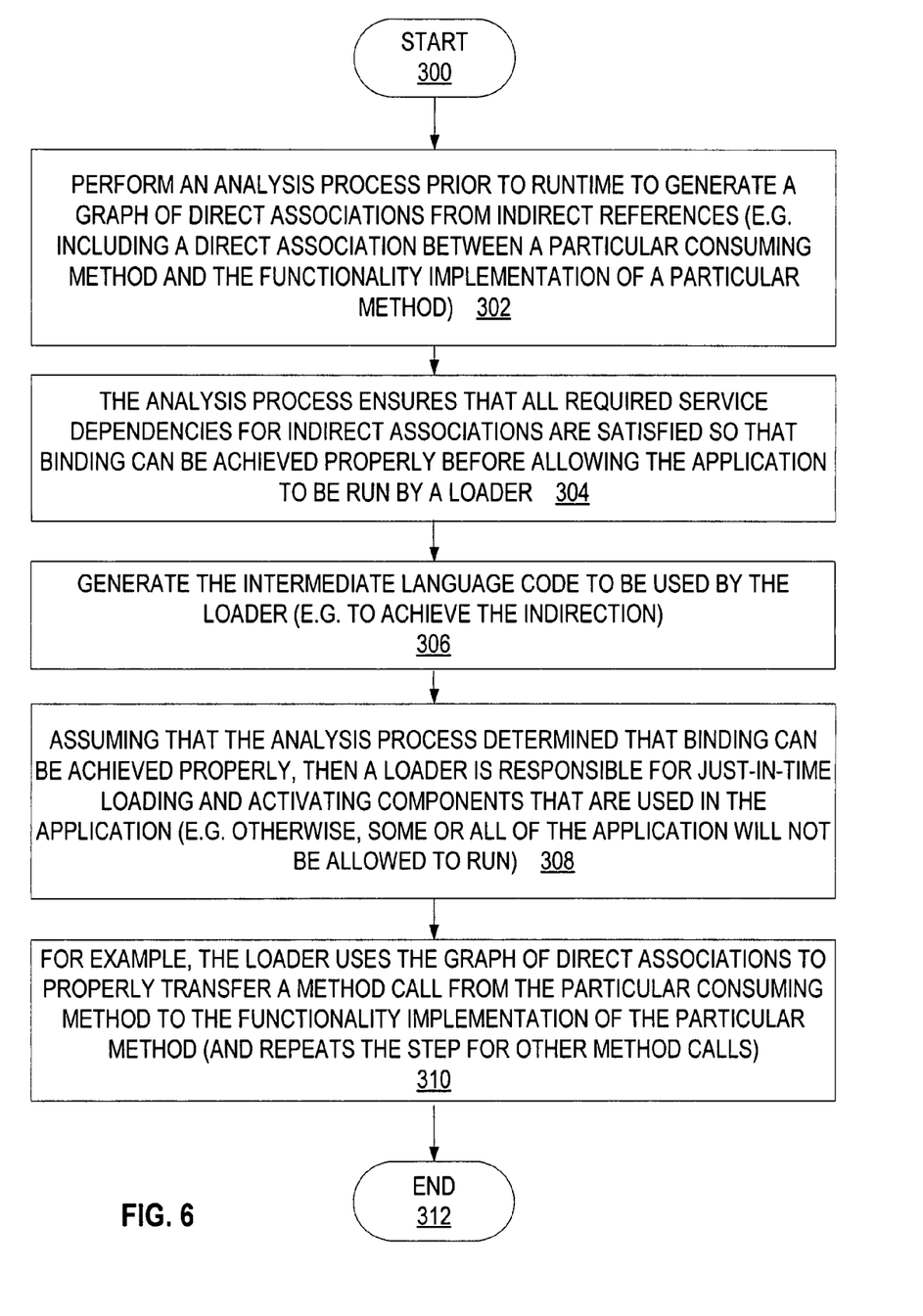
FIG. 6 is a process flow diagram for one implementation of the system of FIG. 1 illustrating the stages involved in performing an analysis process and a loading process to construct and load the application.

FIG. 6 illustrates one implementation of the stages involved in performing an analysis process and a loading process to construct and load the application. In one form, the process of FIG. 6 is at least partially implemented in the operating logic of computing device 100. The process begins at start point 300 with performing an analysis process prior to runtime to generate a graph of direct associations from indirect references (e.g. including a direct association between a particular consuming method and the functionality implementation of a particular method) (stage 302). The analysis process ensures that all required service dependencies for indirect associations are satisfied so that binding can be achieved properly before allowing the application to be run by a loader (stage 304). If the analysis process determines that binding cannot be achieved properly, then some or all of the application will not be allowed to run (stage 304). The system generates the intermediate language code to be used by the loader (e.g. to achieve the indirection) (stage 306). Assuming that the analysis process determined that binding can be achieved properly, then a loader is responsible for just-in-time loading and activating of components that are used in the application (stage 308). As an example, the loader uses the graph of direct associations to properly transfer a method call from the particular consuming method to the functionality implementation of the particular method (and repeats the step for other method calls) (stage 310). The process ends at end point 312.

Figure 7:
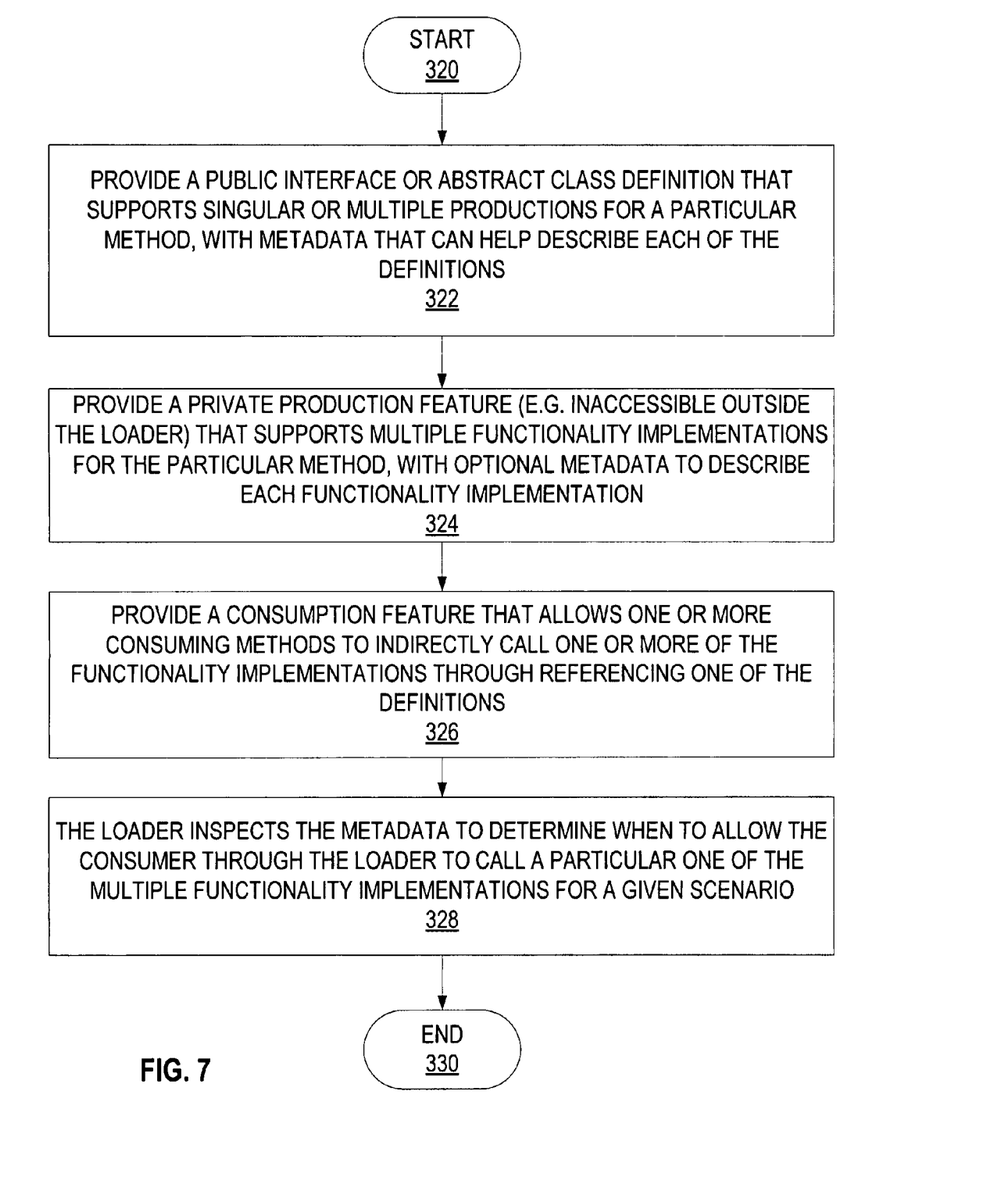
FIG. 7 is a process flow diagram for one implementation of the system of FIG. 1 that illustrates the stages involved in providing multiple implementations of a particular method using extensions.

FIG. 7 illustrates one implementation of the stages involved in providing multiple implementations of a particular method using extensions. In one form, the process of FIG. 7 is at least partially implemented in the operating logic of computing device 100. The process begins at start point 320 with providing a public interface or abstract class definition that supports singular or multiple productions for a particular method, with metadata that can help describe each of the definitions (stage 322). A private production feature (e.g. inaccessible outside the loader) is provided that supports multiple functionality implementations for the particular method, with optional metadata to describe each functionality implementation (stage 324). A consumption feature is provided that allows one or more consuming methods to indirectly call one or more of the functionality implementations through referencing one of the definitions (stage 326). The loader inspects the metadata to determine when to allow the consumer through the loader to call a particular one of the multiple functionality implementations for a given scenario (stage 328). In one implementation, functionality implementations are not loaded during inspection time, only at first invocation (eager loading). The process ends at end point 330.

Figure 8:
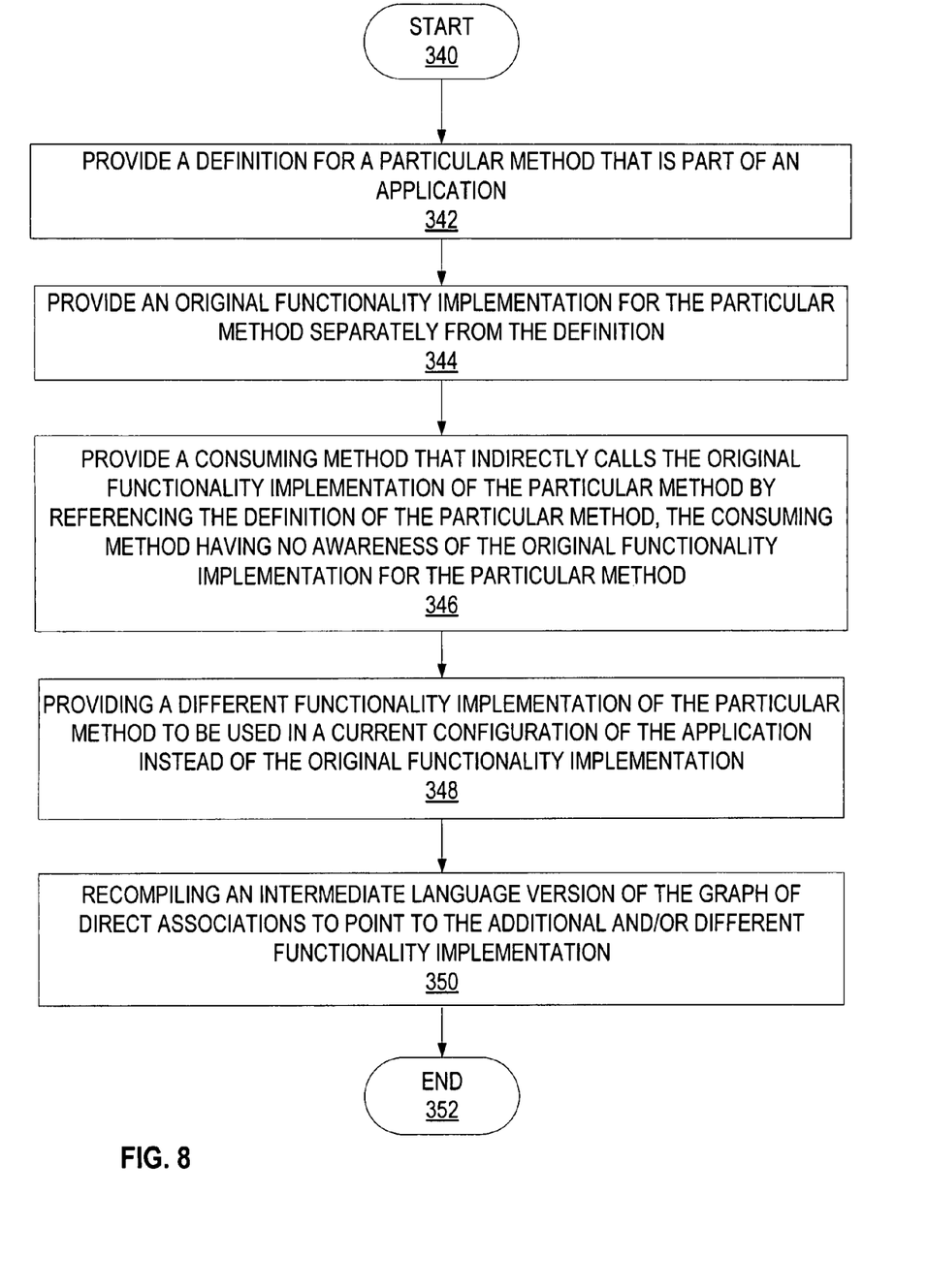
FIG. 8 is a process flow diagram for one implementation of the system of FIG. 1 that illustrates the stages involved in replacing an original functionality implementation of a method with a different functionality implementation.

FIG. 8 illustrates one implementation of the stages involved in replacing an original functionality implementation of a method with a different functionality implementation. In one form, the process of FIG. 8 is at least partially implemented in the operating logic of computing device 100. The process begins at start point 340 with providing a definition for a particular method that is part of an application (stage 342). An original functionality implementation is provided for the particular method separately from the definition (stage 344). A consuming method is provided that indirectly calls the original functionality implementation of the particular method by referencing the definition of the particular method, the consuming method having no awareness of the original functionality implementation for the particular method (stage 346). At a later point in time, a different functionality implementation is provided of the particular method to be used in a current configuration of the application instead of the original functionality implementation (stage 348). An intermediate language version of the graph of direct associations is recompiled to point to the additional and/or different functionality implementation (stage 350). The process ends at end point 352.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the client and/or server arrangements, user interface screen content, and/or data layouts as described in the examples discussed herein could be organized differently on one or more computers to include fewer or additional options or features than as portrayed in the examples.

What is claimed is:

1. A method for providing a programming model for modular development comprising the steps of:
   providing a definition feature that allows a definition to be specified for a particular method that is part of an application, wherein the definition specifies a signature of a functionality implementation of the particular method;
   providing a production feature that allows a the functionality implementation to be specified for the particular method separately from the definition, wherein the production feature prohibits the functionality implementation from being declared as a public method to ensure that no method calls can be made directly to the functionality implementation;
   providing a consuming method that indirectly calls the functionality implementation of the particular method by referencing the definition of the particular method, the consuming method having no awareness of the functionality implementation for the particular method;
   performing an analysis process prior to runtime to generate a graph of direct associations from indirect references, including a direct association between the consuming method and the functionality implementation of the particular method without having to actually load the components, wherein the analysis process ensures that all required service dependencies for indirect associations are satisfied so that binding can be achieved properly before allowing the application to be run by a loader; and
   using a computing device, at runtime, executing the loader to use the graph of direct associations to properly transfer the method call from the consuming method to the functionality implementation of the particular method.

2. The method of claim 1, wherein the loader is responsible for just-in-time loading and activating components that are used in the application.

3. The method of claim 1, wherein multiple productions can be specified for the particular method using the definition feature, wherein multiple functionality implementations can be specified for the particular method using the production feature, and wherein metadata can be specified for each of the multiple definitions to allow the consumer through the loader to determine when to call a particular one of the multiple functionality implementations for a given scenario.

4. The method of claim 1, wherein the definition is provided by a public interface.

5. The method of claim 1, wherein the definition feature allows the interface to be decorated with a pre-defined definition attribute to designate the interface as the definition for the particular method.

6. The method of claim 1, wherein the production feature allows the functionality implementation of the particular method to be decorated with a predefined production attribute to designate that the functionality implementation of the particular method is present.

7. The method of claim 1, wherein the consumption feature allows the consuming method to be decorated with a predefined consumption attribute to designate that the consuming method contains the method call that references the definition of the particular method.

8. A computer storage memory having computer-executable instructions for causing a computer to perform the steps recited in claim 1.

9. A computer storage memory having computer-executable instructions for causing a computer to perform steps comprising:
   provide a definition feature that allows a definition to be specified for a producer that is part of an application, wherein the definition specifies a signature of a functionality implementation of the particular method;
   provide a production feature that allows the functionality implementation to be specified for the producer separately from the definition, wherein the production feature prohibits the functionality implementation from being declared as a public method to ensure that no method calls can be made directly to the functionality implementation;

providing a consumer that indirectly calls the functionality implementation of the producer by referencing the definition of the producer, the consuming method having no awareness of the original functionality implementation for the producer;

prior to runtime, provide an analysis process that is operable to inspect components containing a plurality of indirect associations between consumers and producers of application functionality for an application to generate a graph of direct associations between the consumers and producers without having to actually load the components, the plurality of indirect associations comprising definitions, each definition comprising metadata used by consumers to differentiate between intended uses of producers, wherein the analysis process ensures that all required service dependencies for indirect associations are satisfied so that binding can be achieved properly before allowing the application to be run by a loader; and provide, at runtime, a loader process that is operable to use the graph of direct associations to transfer a method call from the consumer to the functionality implementation of the producer.

10. The computer storage memory of claim 9, wherein the analysis process is operable to output the direct associations in an intermediate language.

11. The computer storage memory of claim 10, wherein the intermediate language is later converted to a machine language using a just-in-time compilation technique.

12. The computer storage memory of claim 9, wherein the analysis process serves as a final compile step to ensure that binding can be achieved between the consumers and producers.

13. The computer storage memory of claim 12, wherein the loader process will not run the application if the analysis process reveals that binding cannot be achieved between the consumers and producers.

14. The computer storage memory of claim 9, wherein the consumers are connected to the producers indirectly through references to interfaces that define the producers.

15. A method for replacing an original functionality implementation of a method with a different functionality implementation comprising the steps of:

providing a definition for a particular method that is part of an application wherein the definition specifies a signature of a functionality implementation of the particular method, the definition comprising metadata used by a consuming method to differentiate between intended uses of the particular method;

providing an original functionality implementation for the particular method separately from the definition;

providing the consuming method that indirectly calls the original functionality implementation of the particular method by referencing the definition of the particular method, the consuming method having no awareness of the original functionality implementation for the particular method;

providing a different functionality implementation of the particular method to be used in a current configuration of the application instead of the original functionality implementation; and using a computing device, recompiling an intermediate language version of a graph of direct associations from indirect references, including a direct association between the consuming method and the different functionality implementation of the particular method without having to actually load the components, wherein the analysis process ensures that all required service dependencies for indirect associations are satisfied so that binding can be achieved properly before allowing the application to be run by a loader; and using a computing device, at runtime, executing the loader to use the graph of direct associations to properly transfer the method call from the consuming method to the different implementation of the particular method.

16. A computer storage memory having computer-executable instructions for causing a computer to perform the steps recited in claim 15.

* * * * *